United States Patent

Bowers et al.

[11] Patent Number: 5,418,295
[45] Date of Patent: May 23, 1995

[54] METHOD OF REDUCING PROTEIN DEPOSITION IN SIGHT CORRECTION DEVICES

[75] Inventors: Roderick W. J. Bowers; Stephen A. Jones; Peter W. Straford; Michael J. Driver, all of Middlesex, United Kingdom

[73] Assignee: Biocompatibles Limited, Middlesex, United Kingdom

[21] Appl. No.: 844,677

[22] PCT Filed: Oct. 15, 1990

[86] PCT No.: PCT/GB90/01586
  § 371 Date: Apr. 13, 1992
  § 102(e) Date: Apr. 13, 1992

[87] PCT Pub. No.: WO91/06019
  PCT Pub. Date: May 2, 1991

[30] Foreign Application Priority Data
  Oct. 13, 1989 [GB] United Kingdom ............... 8923054
  Aug. 14, 1990 [GB] United Kingdom ............... 9017762

[51] Int. Cl.$^6$ .................. C08J 7/12; C08F 8/32
[52] U.S. Cl. .................. 525/379; 351/160 R; 351/160 H; 523/106; 525/327.4; 525/327.6; 525/328.2; 525/328.8; 525/329.5; 525/329.7; 525/329.9; 525/330.5; 525/374; 525/430
[58] Field of Search ............... 525/328.8, 329.9, 330.5, 525/379, 430

[56] References Cited

U.S. PATENT DOCUMENTS

| | | |
|---|---|---|
| 4,128,318 | 12/1978 | Sieglaff et al. |
| 4,537,746 | 8/1985 | Ogunbiyi ............... 422/28 |
| 4,546,123 | 10/1985 | Schafer et al. |
| 4,655,770 | 4/1987 | Gupta et al. |
| 4,758,595 | 7/1988 | Ogunbiyi ............... 514/635 |
| 4,801,475 | 1/1989 | Halpern et al. |
| 4,833,262 | 5/1989 | Kunzler ............... 556/488 |
| 4,836,986 | 6/1989 | Ogunbiyi ............... 422/28 |

FOREIGN PATENT DOCUMENTS

| | | |
|---|---|---|
| 0032622 | 7/1981 | European Pat. Off. |
| 0192831 | 9/1986 | |
| 0219196 | 4/1987 | European Pat. Off. |
| 0245799 | 11/1987 | European Pat. Off. |
| 0276631 | 8/1988 | |
| 1054635 | 1/1967 | United Kingdom |
| WO85/03295 | 8/1985 | WIPO |
| WO86/02933 | 5/1986 | WIPO |
| WO89/04330 | 5/1989 | WIPO |

OTHER PUBLICATIONS

Bonte et al., "Interactions of polymerizable phosphatidylcholine vesicles with blood components: relevance to biocompatibility," Biochimica et Biophysica Acia 900 (1987), pp. 1-9.

International Search Report, PCT/GB90/01586, Apr. 1992.

International Preliminary Examination Report, PCT/GB90/01586, Jan. 1991.

*Primary Examiner*—Fred Zitomer
*Attorney, Agent, or Firm*—Sughrue, Mion, Zinn, Macpeak & Seas

[57] ABSTRACT

A process for treating polymeric contact lenses comprising the steps of: (a) where necessary, activating the polymeric surface to be treated and (b) treating the surface with a compound of formula (I), wherein X is a group which reacts with the polymer surface; Y is straight or branched $C_{1-6}$ alkylene; the groups R are the same or different and each is straight or branched $C_{1-4}$ alkyl, and $A^-$ is a counterion.

$$X-Y-CH_2N^{\oplus}R_3 \; A^{\ominus} \qquad (I)$$

11 Claims, No Drawings

METHOD OF REDUCING PROTEIN DEPOSITION IN SIGHT CORRECTION DEVICES

The present invention relates to the treatment of sight correction devices to reduce protein deposition and improve compatibility with the eye.

Synthetic polymers are widely employed in sight correction devices, including soft, rigid gas permeable and hard contact lenses and intra-ocular lenses. However, it is now well recognised that the performance of commonly employed polymer compositions can be hindered by the absorption of tear proteins (such as lysozyme) at polymer interfaces. A variety of problems can then result such as a reduction in gas permeability of the lens, discomfort to the patient and loss of visual acuity. Complete rejection of the lens is not uncommon.

The present invention relates to contact lens coating treatments which are convenient and use economical and readily available materials. The coatings produced have good oxygen permeability and resistance to protein binding.

The invention therefore provides a process for treating polymeric contact lenses comprising the steps of:

(a) where necessary, activating the polymeric surface to be treated and (b) treating the surface with a compound of formula (I)

$$X\text{---}Y\text{---}CH_2NR_3\ A \quad (I)$$

wherein

X is a group which reacts with the polymer surface;

Y is a direct bond or a straight or branched $C_{1-6}$ alkylene; the groups R are the same or different and each is straight or branched $C_{1-4}$ alkyl, and $A^-$ is a counterion.

The group X which must react with the polymer surface may be, for example, selected from: an epoxy group or function convertible thereto; a group ZC(O)O— in which Z is a heterocyclic ring, for example benzotriazole or an imidazole ring or a group Z'OC(O)— in which Z' is a succinimido or pentafluorophenyl group.

The epoxy group and the group ZC(O)O— are most preferred as groups X.

The counterion $A^\ominus$ is present such that the compounds are neutral salts. When the compounds are used to coat lenses, the counterion may be exchanged with ions in the tears or in a washing solution applied to the lens, thus the specific nature of the counterion is of little relevance in the present invention. However, physiologically acceptable counterions are preferred. Suitable counterions therefore include halide ions, especially chloride, bromide or fluoride ions, and acetate, citrate, lactate and the like.

The group Y may be any straight or branched $C_{1-6}$ alkylene although straight chain alkylenes are preferred and methylene is most preferred.

The groups R may be the same or different and each may be straight or branched $C_{1-4}$ alkyl. Preferred groups R are methyl, ethyl, n-propyl, and n-butyl. The most preferred group R is methyl.

Preferably all groups R are the same and most preferably they are all methyl.

The preferred compounds of formula (I) are glycidyltrimethylammonium halides and N-(trimethylammonium ethyloxycarbonyl) imidazole chloride (choline imidazolide, also referred to as "CDI-choline").

The most preferred compound of formula (I) is glycidyltrimethylammonium chloride ("choline epoxide").

In the process of the invention, step (a) may be omitted where the surface of the contact lens has sufficient free hydroxyl, carboxyl or primary or secondary amino groups for reaction with the compounds of formula (I). Typical of such contact lenses having adequate surface free reactive groups are those made from polyHEMA (poly 2-hydroxyethyl methacrylate), including both low and high water-content polyHEMA lenses, and lenses made from mixtures of polyHEMA with other methacrylic acid polymers.

With soft contact lenses (high or low water content) the refractive index is mainly dependent on the water content of the lens material. Many surface treatments which rely on reaction with surface hydroxyl or carboxyl groups result in the derivatisation of such groups which affects the water content and may lead to a change in refractive index. This is clearly disadvantageous in the manufacture of lenses. In contrast, by using the compounds of formula (I) although the surface hydroxyl groups are derivatised, new hydrophilic groups are introduced onto the surface of the lens by means of the reaction. The effect of the present surface treatment on refractive index is therefore minimal.

For contact lenses made of other materials which do not have surface hydroxyl, carboxyl or amino groups, such as polymethyl methacrylate, it is necessary to activate the surface before treatment with the compounds of formula (I). This can be effected by known etching or derivatising techniques, such as grafting, which introduce hydroxyl, carboxyl, or primary or secondary amino groups on the surface. [see e.g. "Chemical Reactions of Polymers", Ed. E. M. Fettes, 1964, Interscience Publishers, London].

Step (b) of the process is suitably conducted in an aqueous medium at neutral, acid or alkaline pH, in the range from pH 3 to 12. For example, when X in formula (II) is an epoxy group or function convertible there to the pH is preferably from 3 to 6 or from 9 to 12. When the compound of formula (II) is N-(trimethylammonium ethyloxycarbonyl)imidazole chloride the pH is preferably from pH 6.5 to 9. Preferably the pH of the medium employed with heterocyclic based treatments is adjusted and controlled using buffers such as sodium bicarbonate at pH 8 to 9. With epoxide and epoxy precursor treatments the reaction is most preferably conducted in the presence of a base such as sodium hydroxide at appropriate concentrations, for instance at 0.2M or less, preferably 0.02M or less and perhaps as low as 0.01M.

The coating reaction is preferably conducted at any temperature from above 0° C. provided that the temperature does not damage the chemical structure or physical properties of the lens being treated. Preferably the reaction is conducted at up to 50° C., more preferably at from 4° C. to 20° C.

Following the coating reaction, the lens may be washed to remove unreacted compound for instance using phosphate buffered saline, or other physiologically acceptable buffer.

The compounds of formula (I) are generally known and are commercially available or may be produced by known methods from readily available starting materials. Compounds wherein X is an epoxy group are produced by reacting a haloepoxide with the appropriate alkylamine, for instance:

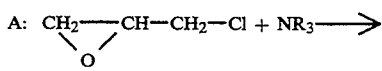

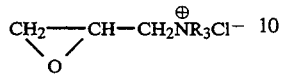

thus choline epoxide may be produced by reacting 3-chloropropylene oxide with trimethylamine.

When X is the group ZC(O)C— in which Z is an imidazole ring, the compound of formula (I) is typically prepared by reacting a suitable amino alcohol with N,N'-carbonyldiimidazole and subjecting the product to quaternisation.

For example:

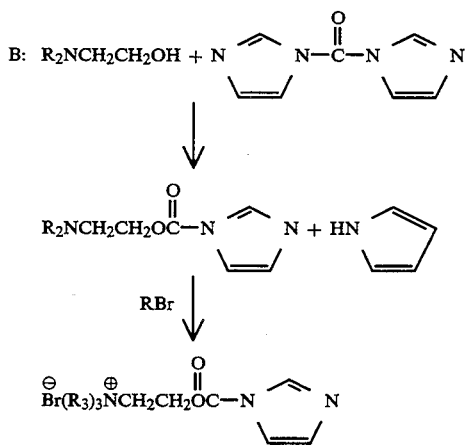

Thus N-(trimethylammonium ethyloxycarbonyl) imidazole) may be produced by reaction of N,N'-carbonyldiimidazole with N,N-dimethyl ethanolamine followed by quaternisation with an alkyl halide.

Compounds where X is the group Z'OC(O)—, in which Z' is a succinimide or pentafluorophenyl group, may be prepared by the reaction of an appropriate betaine with succinimide or pentafluorophenol respectively.
For example:

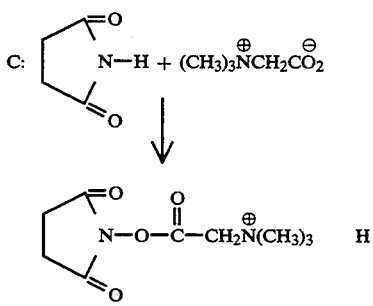

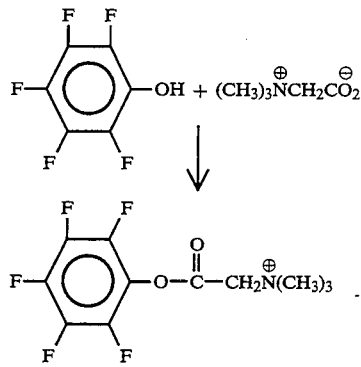

When the group X in formula (I) as defined above is an epoxy group, the compound which reacts with the contact lens surface may alternatively be generated in situ by treating the polymeric surface bearing hydroxy or carboxylic acid groups with an epoxide precursor, a 3-halo-2-hydroxyalkyl trialkylammonium halide. The present invention therefore further provides a process for treating polymeric contact lenses which comprises treating the surface thereof, under aqueous basic conditions with a compound of formula (II):

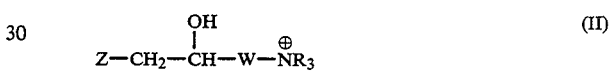

wherein Z is a leaving group,

W is a straight or branched $C_1$-$C_5$ alkylene chain, optionally interrupted by one or more oxygen atoms; and R is as defined in formula (I) above.

The group Z is a suitable leaving group such as a halogen, sulphonate ester or other known in the art. When it is a halogen it may be, for example, chlorine or iodine. Preferably Z is chlorine. The linkage W may be a short-chain polyalkylene or a polyalkylene oxide. Preferably, however, it is a methylene linkage. The groups R are typically all methyl groups. A particularly preferred compound of formula (II) is 3-chloro-2-hydroxypropyltrimethylammonium chloride.

The treatment is carried out under aqueous basic conditions, typically at a pH from 9 to 12, for which any conventional aqueous base may be used. Examples of suitable bases include sodium hydroxide and sodium hydrogencarbonate. A suitable temperature at which to carry out the treatment is from 5° C. to 105° C., for example from 15° C. to 60° C. Ambient temperature, from 18° C. to 35° C., may be employed.

When the polymeric lens surface bears carboxylic acid groups, the above treatment results in the lens surface attachment of a hydroxyester group by one of two pathways. A surface organic acid group is first deprotonated, under the basic reaction conditions, to a carboxylate anion. This then reacts either with the epoxide, which is generated as a result of the reaction of the compound of formula (II) with base, or directly with the compound of formula (II) itself.

For example, with 3-chloro-2-hydroxypropyltrimethyl ammonium chloride:

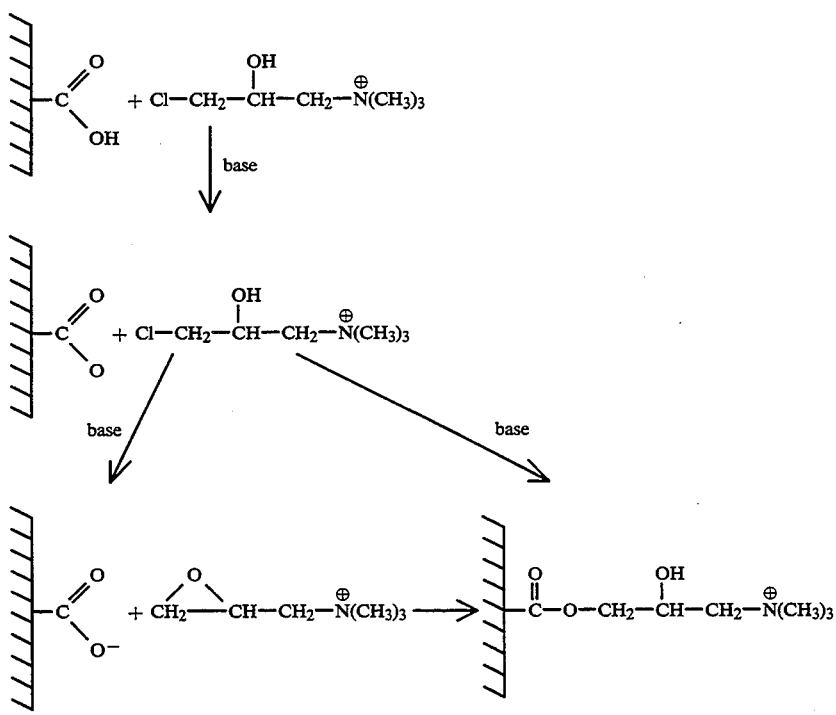

Correspondingly, there are two pathways when a lens surface hydroxy group is treated with a compound of formula (II). Either the epoxide which is generated, reacts with the surface hydroxy group, or the hydroxy group reacts directly with the compound of formula (II). For example:

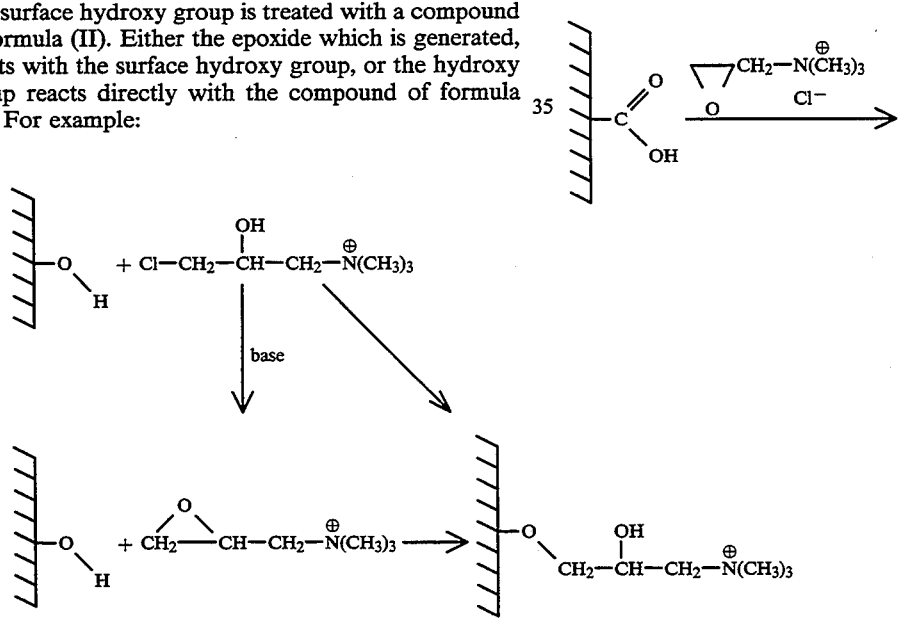

In general, salts such as acetate, citrate or lactate are preferably formed at an early stage in either treatment process. They are formed conventionally by anion exchange, employing standard techniques well known in the art.

The present invention further provides a contact lens surface coated with covalently bound residues of a compound of formula (I). When the compound of formula (I) is choline epoxide, the reaction with a surface bearing carboxyl groups results in the following reaction:

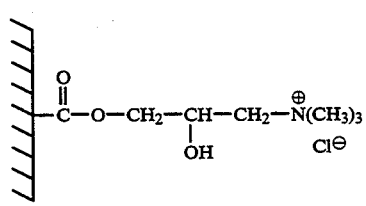

With a surface which bears hydroxyl groups,

-continued
choline epoxide reacts as follows:

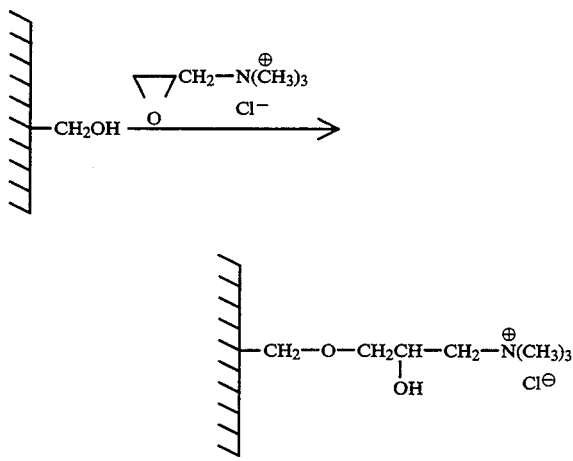

When the compound of formula (I) is CDI-choline, reaction with a surface bearing carboxyl groups or hydroxy groups leads to the following two reactions, respectively:

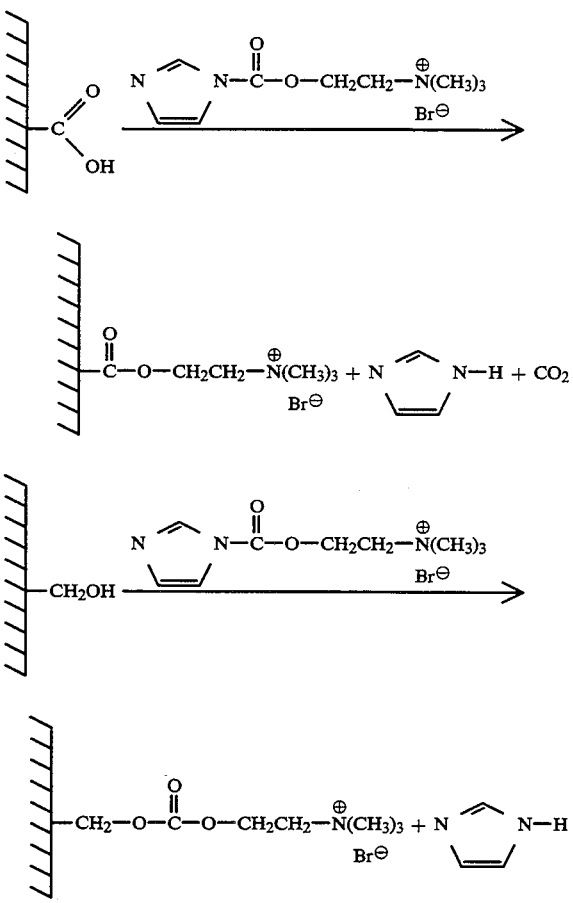

The invention will now be illustrated by the following Examples.

EXAMPLE 1

Three types of commercially available contact lenses made from polyHEMA (denoted A, B and C) were coated with 80 mg, 100 mg or 250 mg of choline epoxide or CDI-choline. The choline epoxide was produced by the reaction between N,N'-carbonyldiimidazole and N,N-dimethylethanolamine in dry tetrahydrofuran at room temperature followed by quaternisation under the same conditions.

A saline solution containing a known amount of lysozyme was made up. The coated lenses were then placed in separate vials containing a known volume of this solution. When they had been immersed for a fixed period of time, the lenses were removed and the UV absorbance of the solutions was determined. In addition the UV absorbance of "control" solutions of the same volume and lysozyme concentration which had not had lenses immersed in them was determined.

The absorbance values of the solutions in which lenses had been immersed were then subtracted from the values obtained for the control solutions, thereby enabling the amount of lysozyme taken up by the lenses to be calculated. The mass of lysozyme per unit area of lens was then established by the use of calibration curves.

The process described above was repeated using lenses A, B and C which had not been coated. The results obtained enables the percentage reduction in lysozyme absorption, which is achieved by coating lenses in accordance with the invention, to be calculated. The results are tabulated below:

TABLE 1

| Lens | Coating | | Reduction in Lysozyme absorption (%) |
|---|---|---|---|
| | Amount (mg) | Compound | |
| A | 100 | CDI-choline | 95.70 |
| A | 250 | choline epoxide | 94.80 |
| B | 250 | choline epoxide | 97.85 |
| B | 250 | CDI-choline | 96.00 |
| B | 100 | CDI-choline | 95.70 |
| C | 80 | CDI-choline | 91.85 |
| C | 250 | choline epoxide | 93.75 |

The results show that the coating of the invention is highly effective in reducing the amount of protein which attaches to a contact lens surface.

EXAMPLE 2

A number of class 4-hydroxyethylmethacrylate-comethacrylic acid copolymer contact lenses were treated with 3-chloro-2-hydroxypropyltrimethylammonium chloride as follows:

The lenses were first washed in sodium bicarbonate buffer at pH 9.0 for 1 hour (10 ml/lens). They were then rolled in sample vials on a Denley Spiramix 5 roller mixer in sodium bicarbonate buffered 110 mg/ml 3-chloro-2-hydroxypropyltrimethylammonium chloride solution (0.52 ml/lens) for 1 hour. This was then followed by the addition to the 3-chloro-2-hydroxypropyl-trimethylammonium chloride solution of 1.12M sodium hydroxide solution (0.52 ml/lens). The lenses were then rolled for an additional 16 hours and then soaked in borate buffered saline (pH 7.1) for 5 hours (20 ml/lens). The buffer was replaced every hour with fresh solution. Finally the lenses were re-equilibrated and stored in borate buffered saline at pH 7.1 (1.7 ml/lens).

The lenses were tested for the level of protein deposition by a spectrophotometric method and their equilibrium water content measured by both gravimetric and refractive index techniques. These tests were carried out on the lenses before and after sterilization by conventional autoclaving (121° C. for 20 minutes).

Protein deposition studies were carried out as follows:

The treated lenses were each immersed in a known volume of a protein solution comprising a known concentration of both bovine serum albumin and chicken egg lysozyme. The solutions were then incubated at 34° C. for 24 hours. The lenses were then rinsed with borate buffered saline, clamped in holders and immersed in borate buffered saline in quartz UV spectrometer cells. The level of protein on the lens was determined by comparing the adsorption at 280 nm of the untreated lens with that of the treated. Through the use of a calibration curve it was possible to calculate the mass of protein adsorbed per unit area of lens and the reduction in protein deposition relative to the untreated lens.

The equilibrium water content of the lenses was measured gravimetrically. Treated and untreated lenses were removed from borate buffered saline, lightly blotted to remove surface moisture and then weighed. The lenses were then dried under vacuum at 80° C. for 24 hours and reweighed. The equilibrium water content was calculated as a percentage by subtracting the dry weight from the wet weight, dividing this by the wet weight and multiplying by 100.

Lenses treated by this process displayed the following properties:

|  | Non-autoclaved | Autoclaved |
| --- | --- | --- |
| Equilibrium Water Content % | 54.2 | 53.8 |
| Reduction in Protein Deposition % | 99.3 | 99.2 |
| Mass of protein Adsorbed $\mu q/cm^{-1}$ | 5.2 | 5.9 |

We claim:

1. A process for treating polymeric contact lenses comprising the steps of:
   (a) providing a polymeric surface having hydroxyl, carboxyl or primary or secondary amino groups thereon including, where necessary, the steps of activating the surface of a polymeric contact lens to provide said polymeric surface having hydroxyl, carboxyl or primary or secondary amino groups, and
   (b) treating the polymeric surface having hydroxyl, carboxyl or primary or secondary amino groups thereon in an aqueous medium at a pH in the range of 3 to 12 at a temperature in the range of 0° to 105° C. with a compound of formula (I):

$$X-Y-CH_2N^{\oplus}R_3 \ A^{\ominus} \quad (I)$$

wherein X is a group which reacts with the hydroxyl, carboxyl or primary or secondary amino groups on the polymer surface to form a bound residue at the surface;
   Y is a direct bond or a straight or branched $C_{1-6}$ alkylene;
   the groups R are the same or different and each is straight or branched $C_{1-4}$ alkyl, and
   $A^{\ominus}$ is a counterion.

2. A process according to claim 1 wherein, in the compound of formula (I), X is selected from an epoxy group, functions convertible to an epoxy group, groups Z C(O)O— in which Z is a heterocyclic ring and groups Z'OC(O)— in which Z' is succinimindo or pentafluorophenyl.

3. A process according to claim 2 wherein X is selected from an epoxy group and a group ZC(O)O— in which Z is benzotriazole or imidazole.

4. A process according to claim 1 wherein, in the compound of formula (I), Y is methylene.

5. A process according to claim 1 wherein, in the compound of formula (I), the groups R are the same and are methyl, ethyl, n-propyl or n-butyl.

6. A process according to claim 5 wherein the groups R are all methyl.

7. A process according to claim 1 wherein the compound of formula (I) is selected from glycidyltrimethylammonium halides and N-(trimethylammonium ethyloxycarbonyl) imidazole chloride.

8. A process according to claim 1 wherein step (b) is conducted at from above 0° C. to 50° C.

9. A process according to claim 1 wherein, in the compound of formula (I), X is epoxy and the compound of formula (I) is generated in situ.

10. A polymeric contact lens having covalently bound to hydroxyl, carboxyl or primary or secondary amino groups located on the surface thereof residues of a compound of formula (I):

$$X-Y-CH_2N^{\oplus}R_3 \ A^{\ominus} \quad (I)$$

wherein X is a group which reacts with the hydroxyl, carboxyl or primary or secondary amino groups located on the polymer surface to form a bound residue at the surface;
Y is a direct bond or a straight or branched $C_{1-6}$ alkylene;
the groups R are the same or different and each is straight or branched $C_{1-4}$ alkyl, and
$A^{\ominus}$ is a counterion.

11. A process according to claim 1 wherein Y is a direct bond or a straight or branched $C_{1-6}$ alkylene group.

* * * * *